(12) United States Patent
Turner et al.

(10) Patent No.: US 12,068,885 B1
(45) Date of Patent: Aug. 20, 2024

(54) RING NETWORK FOR SPECIFIED DATA TYPE

(71) Applicant: Ethernovia Inc., San Jose, CA (US)

(72) Inventors: Max Klaus Turner, Utrecht (NL); Brian Arnold Petersen, San Francisco, CA (US)

(73) Assignee: Ethernovia Inc., San Jose, CA (US)

( * ) Notice: Subject to any disclaimer, the term of this patent is extended or adjusted under 35 U.S.C. 154(b) by 72 days.

(21) Appl. No.: 17/662,633

(22) Filed: May 9, 2022

Related U.S. Application Data

(60) Provisional application No. 63/188,254, filed on May 13, 2021.

(51) Int. Cl.
*H04L 12/42* (2006.01)
*H04L 45/18* (2022.01)
*H04L 49/25* (2022.01)

(52) U.S. Cl.
CPC .............. *H04L 12/42* (2013.01); *H04L 45/18* (2013.01); *H04L 49/25* (2013.01)

(58) Field of Classification Search
None
See application file for complete search history.

(56) References Cited

U.S. PATENT DOCUMENTS

| | | | |
|---|---|---|---|
| 7,502,375 B2* | 3/2009 | Hahn | H04L 41/0213 370/413 |
| 2003/0091024 A1* | 5/2003 | Stumer | H04M 3/42323 370/352 |
| 2013/0165187 A1* | 6/2013 | Kusakabe | H04W 52/0209 455/574 |
| 2014/0226463 A1* | 8/2014 | Allan | H04L 12/4641 370/222 |
| 2016/0087900 A1* | 3/2016 | Kolmanic | H04L 7/0012 370/235.1 |
| 2020/0228358 A1* | 7/2020 | Rampton | G06N 3/006 |
| 2023/0103012 A1* | 3/2023 | Zinner | H04J 3/0697 370/503 |

* cited by examiner

*Primary Examiner* — Jason E Mattis
*Assistant Examiner* — Bao G Nguyen
(74) *Attorney, Agent, or Firm* — Schwegman Lundberg & Woessner, P.A.

(57) ABSTRACT

Various embodiments provide for a ring network, such as an Ethernet-based ring network, for communicating specified data types, such audio data types. A ring network of some embodiments can be used in such applications as data network communications between sensors (e.g., cameras, motion, radar, etc.) and computing equipment within vehicles (e.g., smart and autonomous cars).

20 Claims, 6 Drawing Sheets

RING NETWORK FOR SPECIFIED DATA TYPE

CROSS-REFERENCE TO RELATED APPLICATION

This application claims priority to and the benefit of U.S. Provisional Patent Application No. 63/188,254, filed on May 13, 2021, which is incorporated herein by reference.

TECHNICAL FIELD

Embodiments described herein relate to data communications and, more particularly, to systems, methods, devices, and instructions relating to a ring network for communicating specified data types.

BACKGROUND

Ethernet physical layer standards can be used for (e.g., symmetric data rates or asymmetric data rates) communication systems depending on the application. Example applications can include a network-attached display (e.g., which can receive a large amount of data and transmit limited amounts of data) and a network-attached camera sensor (e.g., which can transmit large amount of data for captured video and receive limited control input data). For instance, a camera sensor being used by an automobile can use an asymmetric Ethernet data link (e.g., with a processor of the automobile) to send multi-gigabits/s data (e.g., camera captures multiple frames a second) and, in comparison, receive very little data to control operation of the camera sensor (e.g., basic controls to zoom, pan, etc.).

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
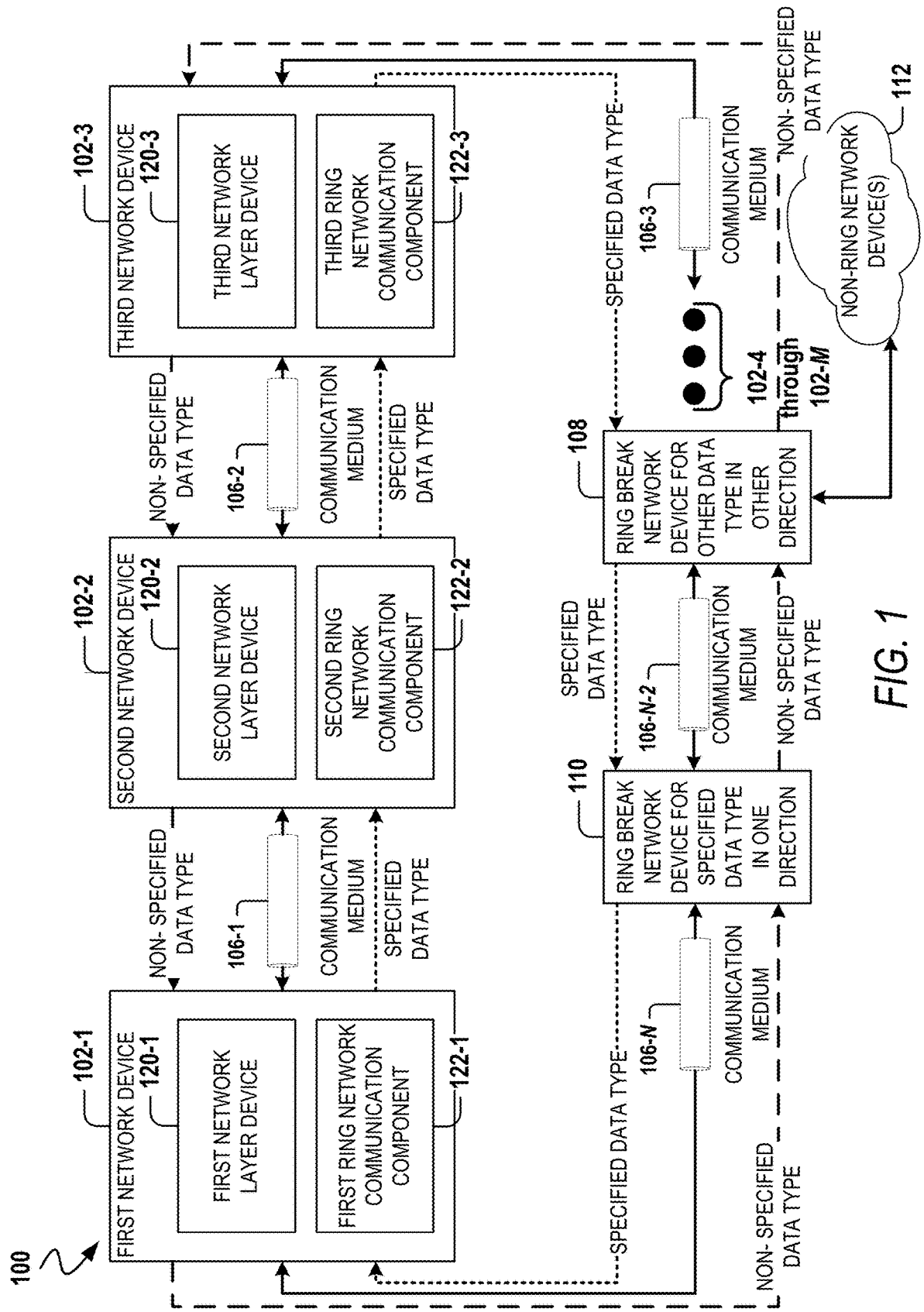
FIG. 1 is a block diagram illustrating an example system that comprises a ring network for communicating one or more specified data types, in accordance with some embodiments.

Various embodiments provide for a ring network, such as an Ethernet-based ring network, for communicating specified data types, such as audio data types. A ring network described herein can be used in such applications as data network communications between sensors (e.g., cameras, motion, radar, etc.) and computing equipment within vehicles (e.g., smart and autonomous cars). For instance, a ring network described herein can be used as data communication between a network device serving as an audio source, such as a network device with audio capture or generation capability (e.g., network device coupled to an audio source device, such as a microphone device). In another instance, a network device serving as an audio endpoint, such a network device with an audio output (e.g., network device coupled to an audio speaker device).

With respect to audio systems, traditional technologies provide specialized solutions, such as Media Oriented Systems Transport (MOST) or $A^2B$ data bus, to provide low latency, digital audio data communication. Examples of digital audio data can include, without limitation, Inter-IC Sound ($I^2S$), time division multiplexed (TDM), and pulse-density modulation (PDM) audio data. For instance, an $A^2B$ data bus can comprise a twisted pair that daisy chains together multiple audio devices and serves as a bi-directional data bus for communicating digital audio data (e.g., for multiple audio channels) with low latency. Similarly, a MOST data bus can be implemented as a daisy chain or ring network for providing low latency communication of audio data by way of optical fiber. This is unlike conventional, general purpose data networks, such as Ethernet, which has difficulty in achieving in same low latency communication of audio data, especially with delay elements (e.g., shapers and store-and-forward switches).

On the other hand, specialized data busses, such as MOST and $A^2B$, can be highly specialized for certain types of data (e.g., audio data) but have trouble with the communication (e.g., transport) of non-audio data, such as software update data, web site data, or large amounts of sensor data (e.g., from a camera in an automotive application). Accordingly, the use of data busses (e.g., MOST or $A^2B$) optimized to communicate certain types of data (e.g., audio data) can lead to the use of another data network, and duplicate communication attachments on network devices (e.g., nodes in an automotive environment), to handle communications of other types (e.g., more generalized types) of data. Additionally, with respect to audio system application (e.g., within an automotive environment) where two different networks are used, a gateway would need to be used to facilitate communication between a specialized audio data network and a more general network. For example, if an audio system uses an Audio Video Bridging (AVB) network and a microphones coupled to an $A^2B$ data bus, a gateway would be used to facilitate communication between the microphone on the $A^2B$ data bus and the AVB network. This gateway represents more hardware and extra cost to facilitate such a solution. Furthermore, specialized data buses can incur new costs due to one or more of the following: use of a high number of specialized hardware devices; need for additional system validation and testing (e.g., protocols, configuration tools, etc.); or re-implementation/re-invention of features such as security and safety that are readily available for more generalized types of networks (e.g., Ethernet).

Various embodiments described herein address these and other deficiencies of conventional technologies. In particular, various embodiments implement or facilitate implementation of a ring network for communicating specified data types, such a data type considered time sensitive for an application. Examples of specified data types can include, without limitation, one or more audio data types (e.g., $I^2S$, TDM, or PDM audio data), or one or more video data types. Depending on the embodiment, a ring network can be implemented using an existing networking standard, such as Ethernet or the like, which can be used to communicate specific or general-purpose data. Some embodiments provide for a ring network (e.g., Ethernet-based ring network) implemented a ring of network devices operatively coupled together as a daisy chain, where each network device can comprise a multi-port bridge (e.g., multi-port Ethernet bridge, such as a three-port Ethernet bridge), where hardware ports used to form the ring network may or may not support a full-duplex data link (e.g., full-duplex Ethernet link), where one or more specified data types (e.g., time-sensitive data types, such as audio data types) are communicated (e.g., transported) in a first direction on the ring network, and where one or more non-specified data types (e.g., other data types, such non-audio data types) are communicated in a second direction on the ring network that is opposite to the first direction. In this way, the direction in which data is communicated on the ring network (e.g., received by a network device on the ring network) can imply a data type of the data (e.g., whether the data is a specified audio data type or not). Additionally, in this way, some embodiments can provide an Ethernet-based ring system that is implemented as a daisy-chain ring of network devices that each includes a multi-port Ethernet bridge. An Ethernet-based ring network of an embodiment can, for example, implement an Ethernet-based audio ring system comprising a daisy-chain ring of network devices that include a multi-port Ethernet bridge, which can provide advantages over more traditional audio data bus technologies, such as MOST and $A^2B$. For instance, a three-port Ethernet bridge can be used in the Ethernet-based audio ring system, where two hardware ports are used to form the Ethernet-based ring network and one hardware port (e.g., local hardware port) is used to either provide audio data to an audio output device (e.g., speaker) coupled to the hardware port, or receive audio data (e.g., captured audio data) from an audio input device (e.g., microphone). Depending on the embodiment, a ring network described herein can be implemented using one or more features associated with a virtual local area network (VLAN).

For various embodiments, one or more specified data types are forwarded through network devices of the ring network in a first direction on the ring network using one or more specific forwarding techniques (e.g., cut-through forwarding), and one or more non-specified data types are forwarded through the network devices in a second (opposite) direction on the ring network using one or more forwarding techniques (e.g., store-and-forward forwarding) different from the one or more specific forwarding techniques. In this way, the one or more specified data types can be communicated over the ring network with a desired latency that is lower than the latency achieved for the one or more non-specified data types communicated over the ring network. For example, some embodiments provide an Ethernet-based ring network for communicating audio data with low latency, where the ring network comprises a daisy-chain of network devices using a multi-port Ethernet bridge (e.g., Ethernet ports configured for full-duplex Ethernet links) audio data only communicates (e.g., travels) in one direction around the ring network and forwarded through the network devices using cut-through forwarding (e.g., in accordance with an IEEE 802 standard), and non-audio data (e.g., regular, non-time-sensitive data) communicates (e.g., travels) around the ring network in the opposite direction and forwarded through the network devices using store-and-forward forwarding.

One or more network devices on the ring network each comprise network switching (e.g., Ethernet switching) hardware to facilitate forwarding of data (e.g., Ethernet data frames) in accordance with various embodiments described herein. According to some embodiments, a given network device on the ring network comprises a multi-port bridge (e.g., multi-port Ethernet bridge), with at least two ports of the bridge configured to couple to two network devices (e.g., network nodes) on the ring network that are adjacent to the given network device. Where the ring network comprises only two network devices, the adjacent network devices for the given network device can comprise the same, single network device. For some embodiments, where a network device on a ring network receives data of a specified data type (e.g., a specified audio data type), and the data comprises destination address information (e.g., in the header) identifies the network device, the network device can forward such data (e.g., using cut-through forwarding) to a local hardware port of the network device that is not coupled to the ring network. For example, where the specified data type is an audio data type, the local hardware port can be associated with an audio output device, such as a speaker that can output data of the audio type.

Further, for some embodiments, where a network device on a ring network generates data of a specified data type (e.g., a specified audio data type) and that data is to be communicated over the ring network, the network device can receive the network via a local hardware port of the network device that is not coupled to the ring network, and can forward such data (e.g., using cut-through forwarding) to a hardware port of the network device designated for outbound data of the specified data type (e.g., the specified audio data type) on the ring network (in the expected direction for the specified data type). For example, where the specified data type is an audio data type, the local hardware port can be associated with an audio input device, such as a microphone that can capture audio and generate an audio signal. A local hardware port of a given network device can be one of the ports of a multi-port bridge included (or implemented by) the given network device.

For some embodiments, at least one network device on a ring network serves as a break on the ring network. For instance, a network device on an Ethernet-based ring network can serve as a break on the ring network by using local media access control (MAC) addresses, Ethertypes (e.g., Ethertype filtering), or virtual local area networks (VLANs). According to some embodiments, at least one network device (on the ring network) serves as a break for data (e.g., Ethernet data frames) of a specified data type (e.g., audio data) traveling in one direction on the ring network and prevent (e.g., by absorbing) such data from looping the ring network more than once (thereby preventing such data from infinitely/endlessly looping around the ring network). In this way, the break for the specified data type can serve as a ring end with respect to the specified data type. Similarly, for some embodiments, at least one network device (on the ring network) serves as a break for data (e.g., Ethernet data frames) of a non-specified data type (e.g., other data, such as non-audio data) traveling in an opposite direction on the ring network and prevent (e.g., by absorbing) such data from looping the ring network more than once (thereby preventing such data from infinitely/endlessly looping around the ring network). In this way, the break for the non-specified data type can serve as a ring end with respect to the non-specified data type. A network device (on the ring network) serving as a break for data of the specified data type can be different or the same as the network device (on the ring network) that serves as a break for data of the non-specified data type. Additionally, at least one network device on a ring network can serve as a break on the ring network that facilitates communication with a network external to the ring network. For instance, network switch hardware of a network device serving as a break on the ring network can decide based on MAC destination address to determine whether to use cut-through forwarding to forward data (e.g., an Ethernet data frame) to a hardware port operatively coupled to a network external to the ring network. The ability to couple to a network external to the ring network (e.g., Ethernet-based ring network) can enable a ring network to form part of a larger network (e.g., larger Ethernet network).

According to some embodiments, network switch hardware of a network device on a ring network is configured to check enough header data of incoming data (e.g., incoming data frame of a specified data type, such as a specified audio data type) such that the network device can ensure the header data is not corrupted prior to being forwarded within or through the network device. In this way, a network device of various embodiments can use Ethernet cut-through forwarding, while preventing the transmission of malformed Ethernet headers. This is unlike traditional Ethernet cut-through forwarding, which does not check for malformed headers in Ethernet data frames.

For some embodiments, the specified data type comprises an audio data type, such as $I^2S$, TDM, or PDM. Audio data communicated on the ring network can comprise Ethernet data frames with a presentation time (e.g., in accordance with IEEE 1722), which can enable the audio data to be delivered into a timed queue that facilitates delivery to a local hardware port of a network device for audio output (e.g., using cut-through forwarding from the local hardware port to an outgoing hardware port for the specified data type). Additionally, for audio data captured by a microphone coupled to a local hardware port of a network device, the audio data can include presentation time (e.g., in accordance with IEEE 1722) that can ensure data is read into a timed queue that facilitates transmission on the ring network in a direction of the specified data type (e.g., using cut-through forwarding from an incoming hardware port for the specified data type to the local hardware port).

In various embodiments, a learning mechanism of network devices on the ring network is used to configure and determine addresses of network devices on the ring network. For instance, Ethernet network devices on an Ethernet-based ring network can use a learning mechanism of the Ethernet network devices (e.g., Ethernet bridges), such as a service-discovery multicast feature, to configure and identify addresses (e.g., MAC addresses) of the Ethernet network devices on the Ethernet-based ring network. With use of a learning mechanism, learning rules of network devices on the ring network can be modified or adapted as the source address of an incoming data (e.g., incoming data frame) is learned on an outgoing hardware port coupled to the ring network. Use of a learning mechanism allows various embodiments to avoid having to pre-configure addresses of network devices on the ring network.

By use of various embodiments described herein, a general-purpose network, such as an Ethernet-based network, provides communication for a specified data type (e.g., a specified audio data type) with desired (e.g., stringent) latency requirements. Where the specified data type comprises a specified audio data type, the low latency communication of audio data in a first direction on a ring network (as described herein) can facilitate transient noise cancellation, while enabling communication of non-audio data in a second (opposite) direction on the ring network, which can enable software updates (e.g., full software updates) of network devices on the ring network and can reduce or eliminate device variance on the ring network. Additionally, use of various embodiments can re-use existing network standards, such as existing Ethernet standards and protocols, which can not only reduce cost or simplify implementation of a ring network but provide for features (e.g., security features) of the existing network standards not provided by traditional data bus technologies (e.g., MOST or $A^2B$ data bus).

As used herein, data of a specified data type can comprise a data frame or a data packet (e.g., in accordance with a network standard) that includes data payload of the specified data type. Similarly, data of a non-specified data type can comprise a data frame or a data packet (e.g., in accordance with a network standard) that includes data payload of the non-specified data type. Header information for data received and transmitted can comprise header information included by a data frame or data packet that carries data payload of a (e.g., specified or non-specified) data type. As used herein, it will be understood that audio data and audio data type represent just some examples of time-sensitive data that can benefit from communication using a ring network in accordance with some embodiments described herein. For instance, a ring network of an embodiment can be configured, implemented, or optimized to prioritize communication of one or more video data types with low latency over other types of data. Additionally, as used herein, a network layer device can comprise or implement one or more layers of a network device including, but not limited to, layer one (e.g., physical layer (PHY) layer), layer two (e.g., MAC layer), or both.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example system 100 that comprises a ring network for communicating one or more specified data types, in accordance with some embodiments. In FIG. 1, the ring network of system 100 comprises network devices 102-1 through 102-M (collectively referred to as network devices 102), which includes a first network device 102-1, a second network device 102-2, a third network device 102-3, and a fourth network device 102-4. As shown, the ring network comprises a ring break network device 108 for breaking the ring with respect to data of a specified data type (e.g., an audio data type), and a ring break network device 110 for breaking the ring with respect to data of a non-specified data type (e.g., other data types). Additionally, the ring break network device 108 (or the ring break network device 110) can facilitate communication with one or more non-ring network devices 112 that are not on the ring network (e.g., part of an external network). Though shown as separate devices, the ring break network devices 108, 110 can be implemented on a single network device on the ring network, and one or both of the ring break network devices 108, 110 can be implemented as part of one of the network devices 102 (rather than as separate as shown). As also shown, data of the specified data type is communicated (e.g., travels) over the ring network in one direction (e.g., clockwise direction), while data of the non-specified data type (e.g., data types other than the specified data type) is communicated (e.g., travels) over the ring network in the opposite direction (e.g., counterclockwise direction).

Figure 6:
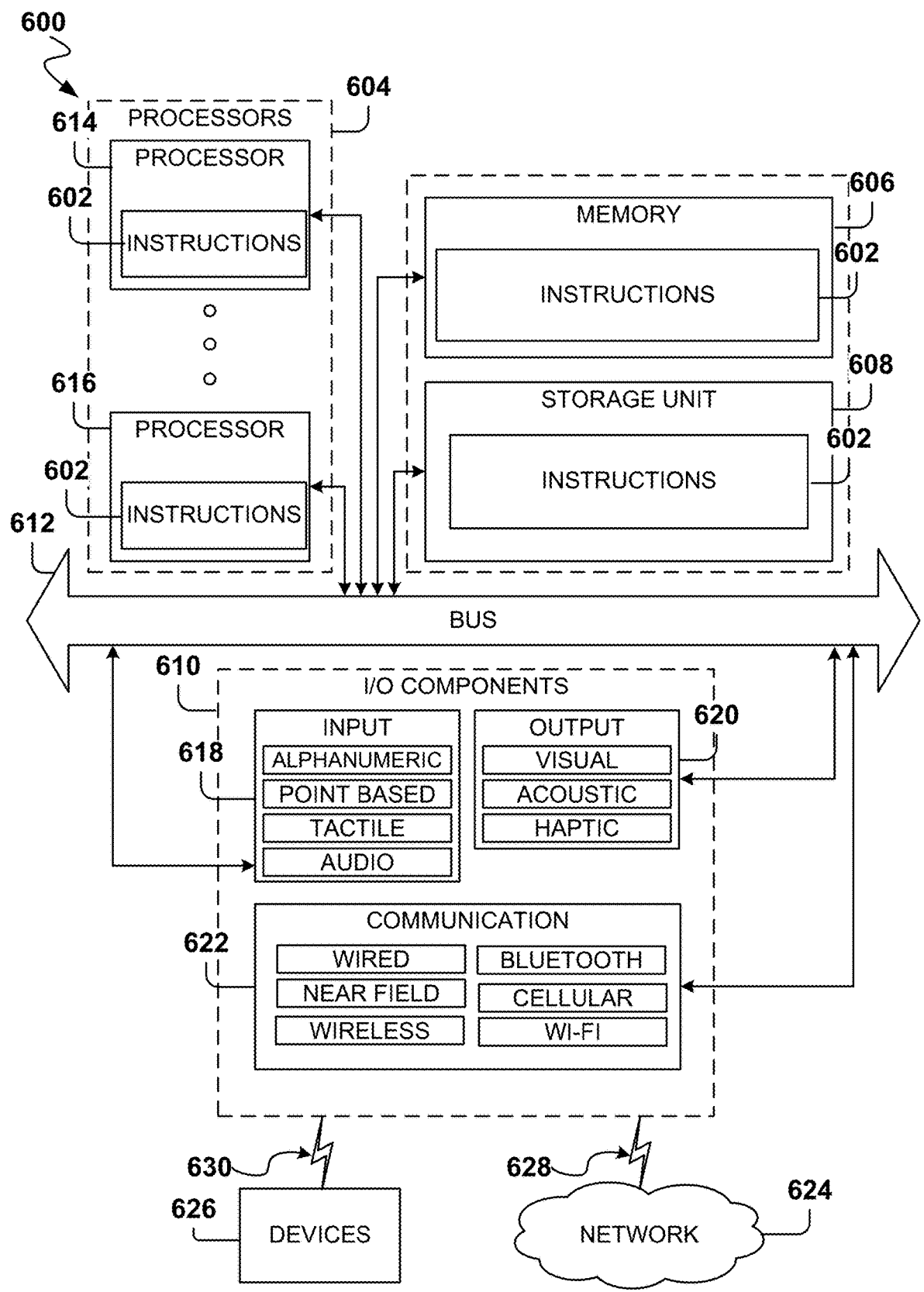
FIG. 6 is a block diagram illustrating components of an example machine that can use one or more embodiments discussed herein.

Depending on the embodiment, any one of the network devices 102 can be implemented (at least in part) by machine 600 of FIG. 6. As shown, communication media 106-1 through 106-N (collectively referred to as communication media 106) include communication medium 106-1 (coupling the network devices 102-1 and 102-2), communication medium 106-2 (coupling the network devices 102-2 and 102-3), communication medium 106-3 (coupling the network devices 102-3 and 102-4), communication medium 106-N−2 (coupling the ring break network devices 108 and 110), and communication medium 106-N (coupling the ring break network device 110 and the network device 102-1), and operatively couples together the network devices 102, the ring break network device 108, and the ring break network device 110 in a daisy chain to form the ring network. One or more of communication media 106 can comprise a wire (e.g., twisted pair) that permits transmission of an analog signal, such as one that can support an Ethernet data link (e.g., full duplex link). As also shown, each of the first, the second, and the third devices 102-1, 102-2, 102-3 comprises a network layer device (a first, a second, and a third network layer device 120-1, 120-2, 120-3), and a ring network communication component (a first, a second, and a third ring network communication component 122-1, 122-2, 122-3), each of which can enable implementation of a ring network (e.g., Ethernet-based ring network) in accordance with various embodiments described herein. An example of a layer device can include, without limitation, a media access control (MAC) layer device (e.g., one that supports an Ethernet standard).

During operation, based on the first ring network communication component 122-1, the first network device 102-1 can receive data of the specified data type through a hardware port coupled to the ring break network device 110 (via the communication medium 106-N) and designated for incoming data of the specified data type. The first network device 102-1 can either forward (e.g., cut-through forward) the data to a hardware port coupled to the second network device 102-2 (via the communication medium 106-1) and designated for outgoing data of the specified data type, forward to a local hardware port (if applicable) for local use (e.g., local hardware port associated with an audio output device), absorb the data (e.g., use the data locally, such as with respect to a local software service) if the first network device 102-1 is the data's destination (e.g., address of the first network device 102-1 matches the destination address of the received data), or some combination of the three previously-described behaviors.

Likewise, based on the first ring network communication component 122-1, the network device 102-1 can receive data of the non-specified data type through a hardware port coupled to the second network device 102-2 and designated for incoming data of the non-specified data type, and either forward (e.g., store-and-forward) the data to a hardware port coupled to the ring break network device 110 and designated for outgoing data of the non-specified data type, absorb the data if the first network device 102-1 is the data's destination, or both forward and absorb the data. Each of the network devices 102 can operate similarly as the first network device 102-1 with respect to its adjacent/neighboring network devices on the ring network based on a respective ring network communication component 122.

For some embodiments, the ring break network device 110 for specified data type in one direction (e.g., clockwise direction) is configured to receive data of the non-specified data type via a hardware port (e.g., hardware port designated for incoming non-specified data type) of the ring break network device 110 (coupled to the first network device 102-1) and to forward (e.g., store-and-forward) the received data (e.g., as-is) to another hardware port (e.g., hardware port designated for outgoing non-specified data type) of the ring break network device 110 (coupled to the ring break network device 108). Additionally, for some embodiments, the ring break network device 110 is configured to receive data of the specified data type via a hardware port (e.g., hardware port designated for incoming specified data type) of the ring break network device 110 (coupled to the ring break network device 108) and to determine whether the received data has already looped the ring network once (e.g., determine whether the received data has been received before by the ring break network device 110). In response to determining the received data of the specified data type has already looped the ring network (e.g., this is the second time the received data has arrived at the ring break network device 110), the ring break network device 110 can absorb (e.g., discard or delete) the received data. However, in response to determining the received data of the specified data type has not already looped the ring network (e.g., this is the first time the received data has arrived at the ring break network device 110), the ring break network device 110 can forward (e.g., cut-through forward) the received data (e.g., as-is) to another hardware port (e.g., hardware port designated for outgoing specified data type) of the ring break network device 110 (coupled to the first network device 102-1).

Similarly, for some embodiments, the ring break network device 108 for specified data type in another direction (e.g., counterclockwise direction) is configured to receive data of the specified data type via a hardware port (e.g., hardware port designated for incoming specified data type) of the ring break network device 108 (coupled to a network device 102-M) and to forward (e.g., store-and-forward) the received data (e.g., as-is) to another hardware port (e.g., hardware port designated for outgoing specified data type) of the ring break network device 108 (coupled to the ring break network device 110). Additionally, for some embodiments, the ring break network device 108 is configured to receive data of the non-specified data type via a hardware port (e.g., hardware port designated for incoming non-specified data type) of the ring break network device 108 (coupled to the ring break network device 110) and to determine whether the received data has already looped the ring network once (e.g., determine whether the received data has been received before by the ring break network device 108). In response to determining the received data of the non-specified data type has already looped the ring network (e.g., this is the second time the received data has arrived at the ring break network device 108), the ring break network device 108 can absorb (e.g., discard or delete) the received data. However, in response to determining the received data of the non-specified data type has not already looped the ring network (e.g., this is the first time the received data has arrived at the ring break network device 108), the ring break network device 108 can forward (e.g., cut-through forward) the received data (e.g., as-is) to another hardware port (e.g., hardware port designated for outgoing non-specified data type) of the ring break network device 108 (coupled to the network device 102-M).

Figure 2:
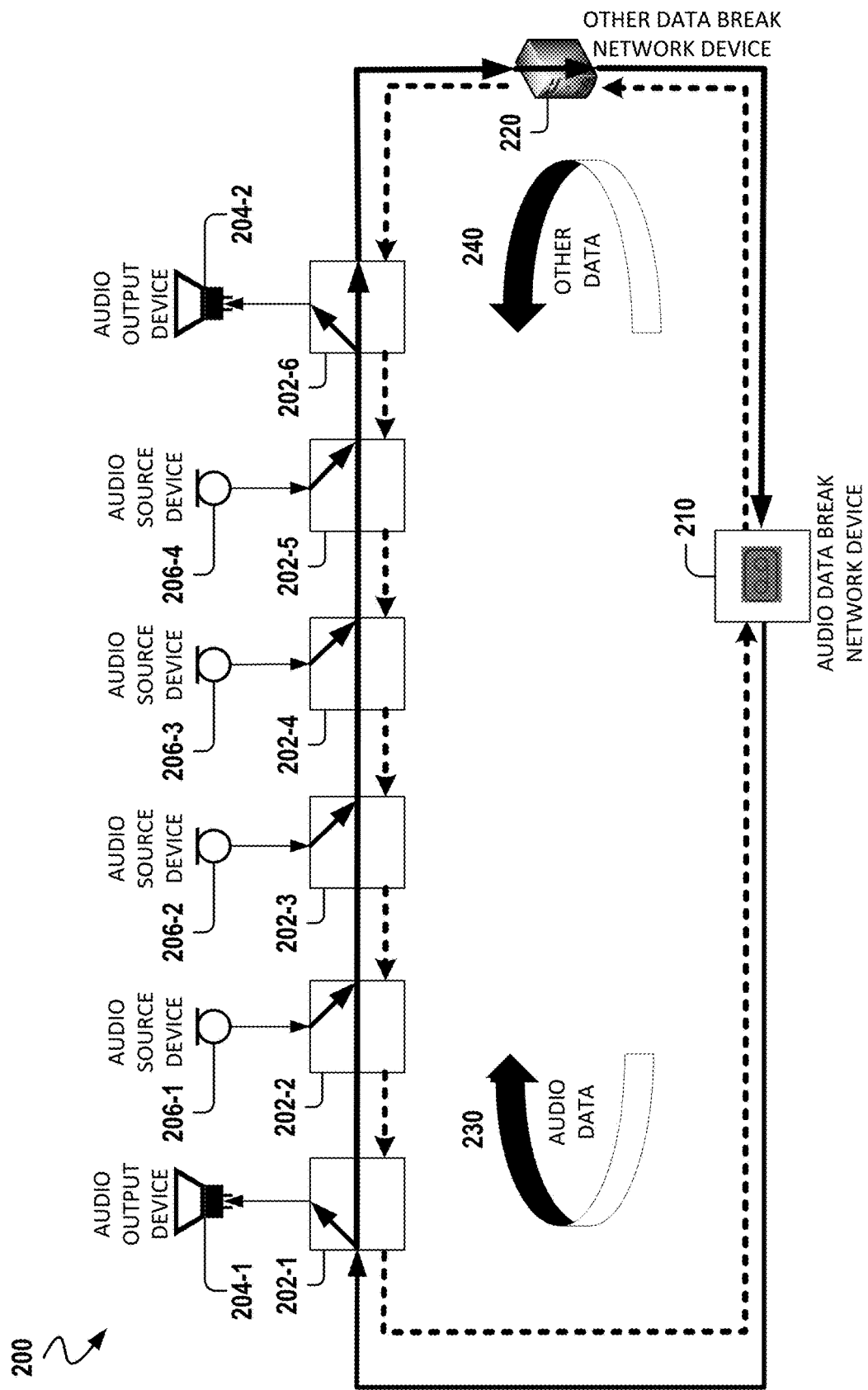
FIG. 2 is a block diagram illustrating an example system that comprises a ring network for communicating one or more specified audio data and other data, in accordance with some embodiments.

FIG. 2 is a block diagram illustrating an example system 200 that comprises a ring network for communicating one or more specified audio data types (e.g., all audio data types) and other data (e.g., all other data types, such as all non-audio data types), in accordance with some embodiments. In particular, the system 200 can represent an audio system (e.g., audio ring system) implemented using the ring network of FIG. 1. For example, the system 200 can implement an Ethernet-based audio ring system in accordance with some embodiments. In FIG. 2, the ring network of the system 200 comprises network audio devices 202-1 through 202-6 (collectively referred to as network audio devices 202), an audio data break network device 210, and an other data break network device 220. As shown, the network audio devices 202, the audio data break network device, and the other data break network device 220 are operatively coupled together (e.g., communication media 106). As also shown, audio data 230 communicates on the ring network in a clockwise direction on the ring network, and other data 240 (e.g., all non-audio data, such as software update data) in a counterclockwise direction on the ring network. The audio data break network device 210 is configured to receive and forward other data 240 (e.g., as-is), and to receive and either forward audio data 230 or absorb audio data 230 to prevent infinite looping. Likewise, the other data break network device 220 is configured to receive and forward audio data 230 (e.g., as-is), and to receive and either forward other data 240 or absorb other data 240 to prevent infinite looping. Additionally, either the audio data break network device 210, the other data break network device 220, or both can enable communication of network devices on the ring network with a network external to the ring network (e.g., non-ring Ethernet network external to the ring network).

The network audio device 202-1 is coupled to an audio output device 204-1, and the network audio device 202-6 is coupled to an audio output device 204-2. An example audio output device can include, without limitation, a speaker. The network audio devices 202-2, 202-3, 202-4, 202-5 are respectively coupled to an audio source device 206-1, 206-2, 206-3, 206-4. An example audio output device can include, without limitation, a microphone.

During operation, each of the network audio devices 202-1, 202-6 can receive other data 240 via one hardware port (of the network audio device designated for incoming other data) coupled to the ring network, and either: forward (e.g., store-and-forward) the received other data 240 to another hardware port (of the network audio device designated for outgoing other data) coupled to the ring network, thereby permitting the received other data 240 to pass through (e.g., as-is) to an adjacent network device on the ring network; absorb (e.g., use by a local service of the network audio device) the received other data 240 if the received other data 240 (e.g., header information associated with the received other data 240) indicates that the destination of the received other data 240 is the network audio device; or both forward and absorb the data. The forwarding of the received other data 240 to the other hardware port causes the received other data to be communicated in the counterclockwise direction on the ring network.

Additionally, during operation, each of the network audio devices 202-1, 202-6 can receive audio data 230 via one hardware port (of the network audio device designated for incoming audio data) coupled to the ring network, and either: forward (e.g., cut-through forward) the received audio data 230 to another hardware port (of the network audio device designated for outgoing audio data) coupled to the ring network (thereby permitting the received audio data 230 to pass through to an adjacent network device on the ring network so the received audio data 230 can reach its destination device/endpoint); forward (e.g., cut-through forward) the audio data 230 to a local hardware port of a network audio device associated with the audio output device coupled to the network audio device (e.g., the audio output devices 204-1 and 204-2 for network audio devices 202-1 and 202-6 respectively) if the received audio data 230 (e.g., header information associated with the received audio data 230) indicates that the destination of the received audio data 230 is the network audio device; or forward the data to both to another hardware port and to a local hardware port of a network audio device. The forwarding of the received audio data 230 to the other hardware port causes the received audio data to be communicated in the clockwise direction on the ring network. The forwarding of the received audio data 230 to the local hardware port can cause the audio data to be outputted to that audio output device (e.g., audio signal described by the audio data is outputted on a speaker).

For each of the network audio devices 202-2, 202-3, 202-4, 202-5, its respective audio source device (206-1, 206-2, 206-3, 206-4) can be coupled to the network audio device via a local hardware port of the network audio device that is associated with the audio source device. During operation, as audio data 230 is provided (e.g., generated) by one of the audio source devices 206-1, 206-2, 206-3, 206-4, the audio data 230 can be provided (e.g., communicated) to its coupled network audio device (206-1, 206-2, 206-3, 206-4) via the local hardware port. Upon receiving the audio data 230 via this local hardware port, the network audio device (206-1, 206-2, 206-3, 206-4) can forward (e.g., cut-through forward) the audio data 230 to a hardware port of the network audio device designated for outgoing audio data, which causes the forwarded audio data to be communicated in the clockwise direction on the ring network.

Further, during operation, each of the network audio devices 202-2, 202-3, 202-4, 202-5 can receive other data 240 via one hardware port (of the network audio device designated for incoming other data) coupled to the ring network, and either: forward (e.g., store-and-forward) the received other data 240 to another hardware port (of the network audio device designated for outgoing other data) coupled to the ring network, thereby permitting the received other data 240 to pass through (e.g., as-is) to an adjacent network device on the ring network; absorb (e.g., use by a local service of the network audio device) the received other data 240 if the received other data 240 (e.g., header information associated with the received other data 240) indicates that the destination of the received other data 240 is the network audio device; or both forward and absorb the data. The forwarding of the received other data 240 to the other hardware port causes the received other data to be communicated in the counterclockwise direction on the ring network.

Figure 3:
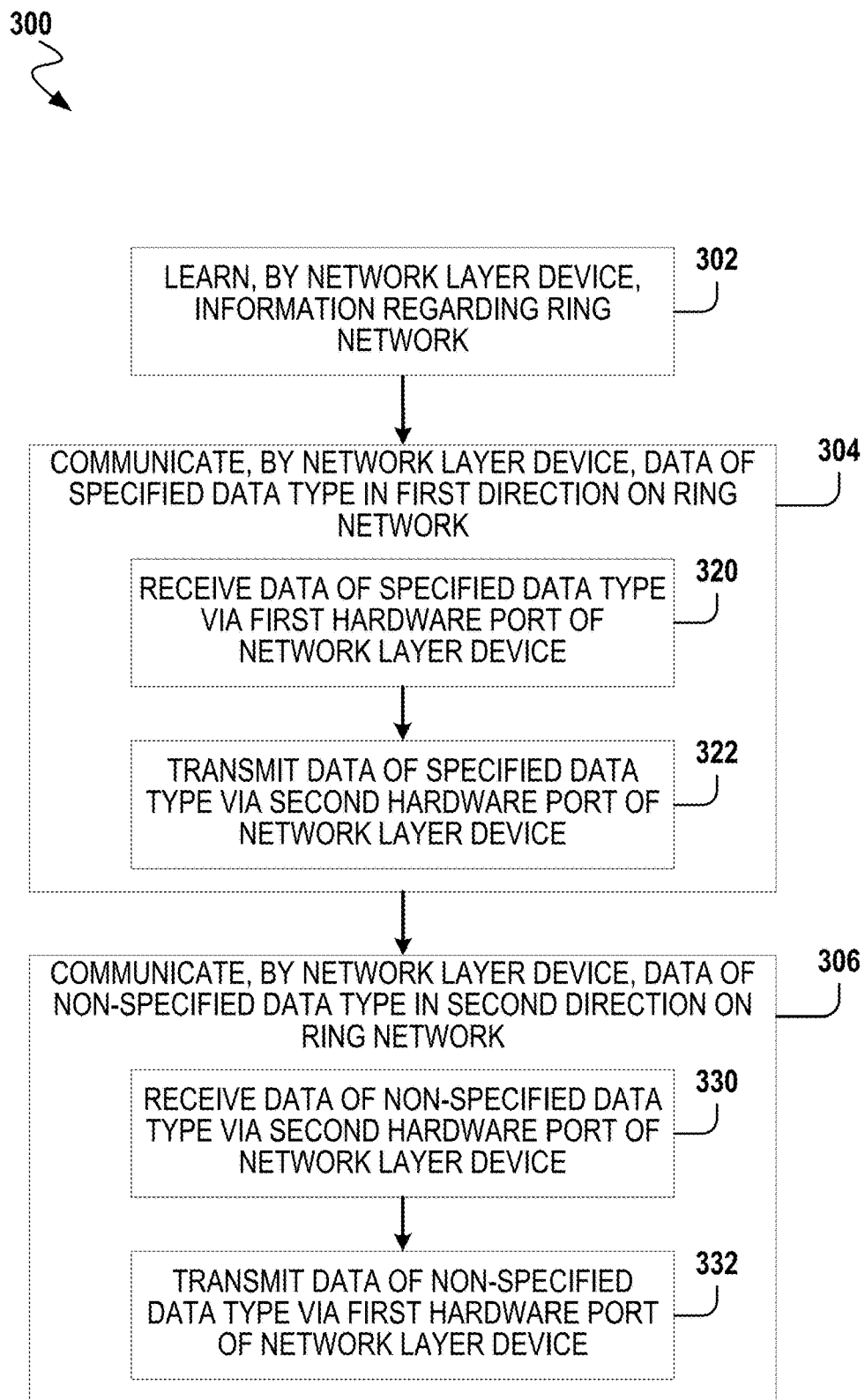
FIGS. 3 through 5 are flowcharts illustrating example methods for a ring network for communicating one or more specified data types, in accordance with some embodiments.
Figure 4:
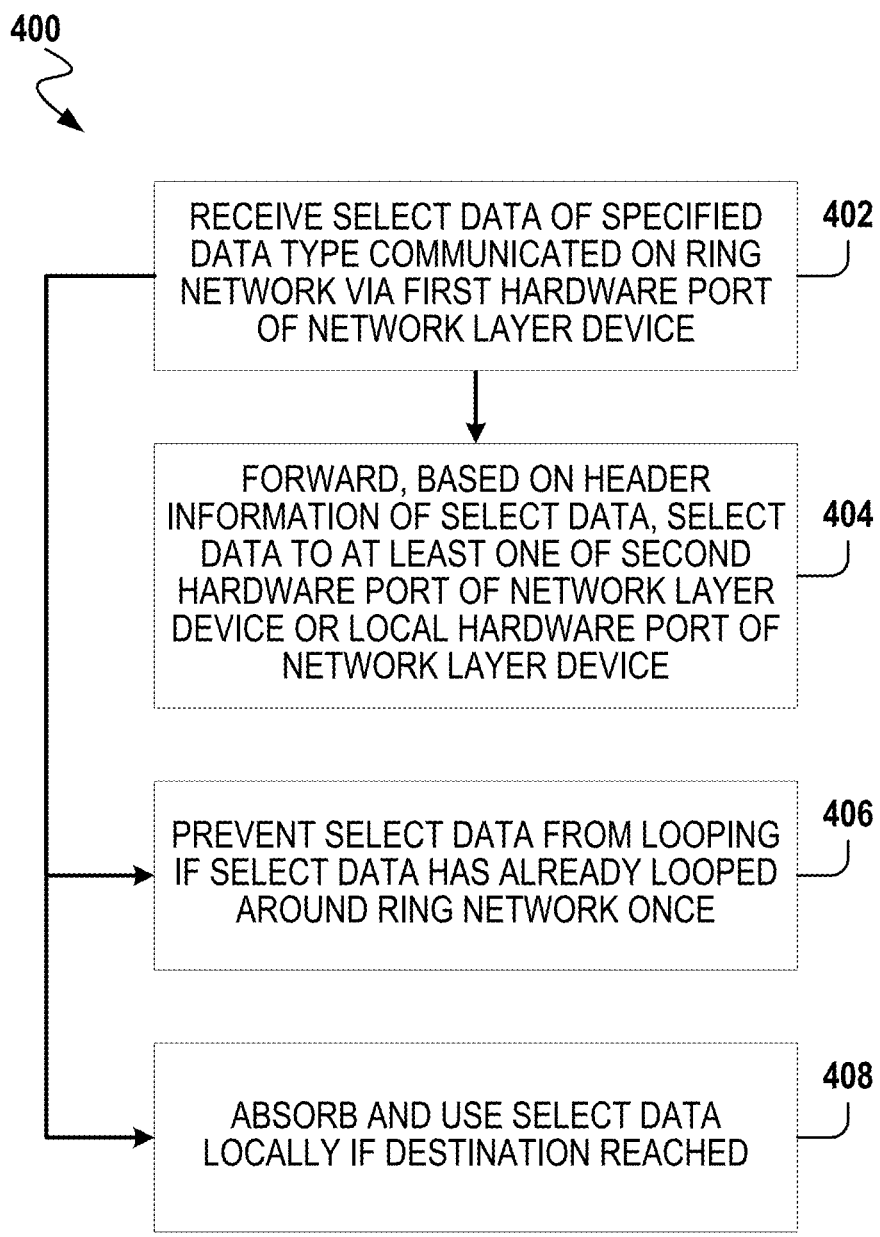
Figure 5:
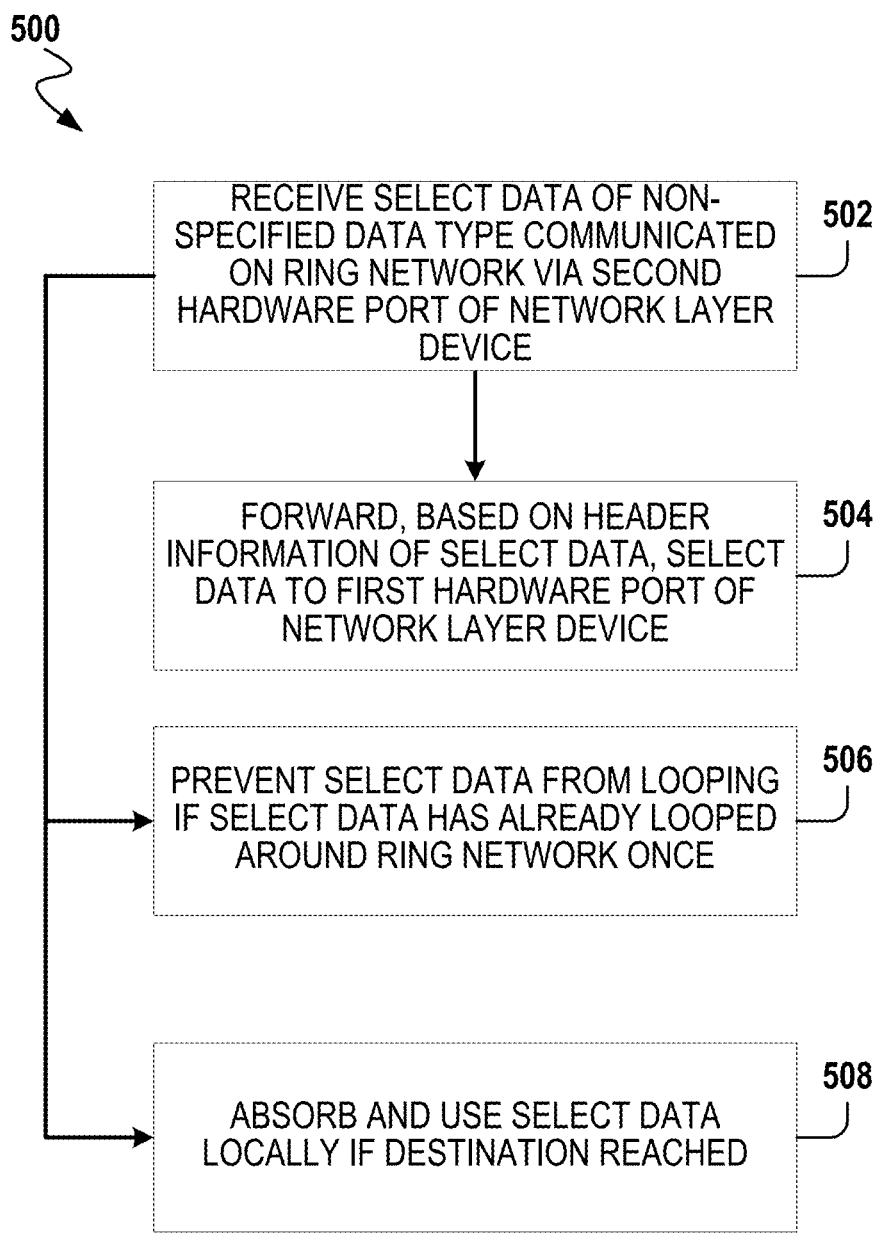

FIGS. 3 through 5 are flowcharts illustrating example methods 300, 400, 500 for a ring network for communicating one or more specified data types, in accordance with some embodiments. It will be understood that example methods described herein may be performed by various components (e.g., circuit components). For instance, the methods 300, 400, 500 may be performed by any one of the network devices 102 described with respect to FIG. 1. For instance, the first ring network communication components 122-1 can cause or enable the first network device 102-1 of FIG. 1 to perform any one of methods 300, 400, 500 in accordance with an embodiment described herein. Depending on the embodiment, an operation of an example method described herein may involve intervening operations not shown. Additionally, though the operations of example methods may be depicted and described in a certain order, the order in which the operations are performed may vary among embodiments, including performing certain operations in parallel.

Referring now to the method 300 of FIG. 3, at operation 302, a network device (e.g., 102-1) learns information regarding a ring network to which it is operatively coupled. For instance, the first network device 102-1 can use the first network layer device 120-1 to perform operation 302. During the learning process, the network device can configure its network address on the ring network, can learn the network addresses (e.g., MAC addresses) of one or more other network devices on the ring network, or both. For instance, during operation 302, the network device can determine the network address of two adjacent (e.g., neighboring) network devices to which it is coupled on the ring network (or the single adjacent network device if there is only one other network device on the ring network).

At operation 304, the network device (e.g., 102-1) communicates, by a network layer device (e.g., 120-1) of the network device, data of a specified data type in a first direction (e.g., clockwise direction) on a ring network. For various embodiments, the ring network is formed by a plurality of network layer devices (e.g., of other network devices 102, and of the ring break network devices 108, 110) operatively coupled together in a daisy-chain, where the plurality of network layer devices includes the network layer device (e.g., 120-1) of the network device (e.g., 102-1).

During operation 304, the network device (e.g., 102-1) performs operation 320 and 322. In particular, at operation 320, the network device (e.g., 102-1) receives, by a first hardware port of the network device (e.g., of the network layer device 120-1), data of the specified data type communicated on the ring network. Thereafter, at operation 322, the network device (e.g., 102-1) transmits, by a second hardware port of the network device (e.g., of the network layer device 120-1), data of the specified data type on the ring network. For instance, data transmitted by the second hardware port can comprise data forwarded from the first hardware port, or data generated or captured (e.g., from a microphone coupled to a local hardware port) locally at the network device At operation 306, the network device (e.g., 102-1) communicates, by the network layer device (e.g., 120-1) of the network device, data of a non-specified data type in a second direction on the ring network, where the second direction is opposite to the first direction. During operation 306, the network device (e.g., 102-1) performs operation 330 and 332. In particular, at operation 330, the network device (e.g., 102-1) receives, by the second hardware port of the network device (e.g., of the network layer device 120-1), data of a non-specified data type communicated on the ring network. Thereafter, at operation 332, the network device (e.g., 102-1) transmits, by the first hardware port of the network device (e.g., of the network layer device 120-1), data of the non-specified data type on the ring network. For instance, data transmitted by the first hardware port can comprise data forwarded from the second hardware port, or data generated locally at the network device.

For various embodiments, the forwarding of data of the specified data type (e.g., audio data) comprises use of cut-through forwarding, which can be in accordance with a current or a future IEEE network standard (e.g., in IEEE 802.1). For various embodiments, the forwarding of data of the non-specified data type (e.g., non-audio data) comprises use of a forwarding method that is slower than cut-through forwarding, such as store-and-forward forwarding, which can at least provide better error detection than cut-through forwarding. Additionally, for some embodiments, the cut-through forwarding used to forward data of the specified data type is adapted to perform some level of error checking of header information to ensure that data (of the specified data type) with malformed header information is not forwarded by the network device (e.g., 102-1).

Depending on the embodiment, the specified data type can comprise a plurality of different data types. The specified data type can comprise a set of audio data types, and a non-specified data type comprises any non-audio data type. For example, the data of the specified data type can comprise one or more data frames in accordance with an IEEE 1722 standard (e.g., IEEE 1722 AVTP). Additionally, the specified data type can comprise a set of time-sensitive data types, and a non-specified data type can comprise any non-time-sensitive data type.

For various embodiments, each of first hardware port and the second hardware port is an Ethernet port, such as a full duplex Ethernet port. The network layer device (e.g., 120-1) of the network device (e.g., 102-1) can be configured to operate as a multi-port bridge. For instance, two hardware ports of the bridge can be coupled to the ring network, and a third hardware port can be used as a local hardware port associated with an audio device, such as an audio input device or an audio output device.

Referring now to the method 400 of FIG. 4, the method 400 illustrates an example of handling data of a specified data type. For some embodiments, the method 400 is performed as part of operation 304 of the method 300 of FIG. 3. At operation 402, a network device (e.g., 102-1) receives, via a first hardware port of a network layer device (e.g., 120-1) of the network device, select data of the specified data type communicated on the ring network.

At operation 404, the network device (e.g., 102-1) forwards, based on header information of the select data (e.g., header information for a data frame comprising the select data), the select data (received at operation 402) to at least one of a second hardware port of the network layer device (e.g., 120-1) or a local hardware port of the network layer device (e.g., 120-1). For instance, if the network device (e.g., 102-1) determines that the select data has not reached a destination network device as identified by a destination address in the header information, the select data can be forwarded to the second hardware port of the network layer device (e.g., 120-1), which results in the select data being transmitted to an adjacent network device on the ring network coupled to the second hardware port. If, however, the network device (e.g., 102-1) determines that the select data has reached a destination network device as identified by a destination address in the header information, the select data can be forwarded to the second hardware port of the network layer device (e.g., 120-1). For example, the specified data type can comprise a set of audio data types, the non-specified data type can comprise any data type other than the set of audio data types, and network device comprises an audio output, where the local hardware port is associated with the audio output. In such an example, the forwarding of the select data to the local hardware port can cause an audio signal described by the select data to be outputted via the audio output (e.g., to an audio output device, such as a speaker). According to some embodiments, the forwarding of the selected data to the second hardware port or the local hardware port comprises using cut-through forwarding (e.g., in accordance with an IEEE network standard).

At operation 406, the network device (e.g., 102-1) prevents the select data (received at operation 402) from looping if the network device (e.g., 102-1) determines that the select data has already looped once around the ring network. The network device (e.g., 102-1) can prevent the select data from looping by preventing the select data from being forwarded and by absorbing (e.g., deleting or discarding) the select data instead. In this way, the network device (e.g., 102-1) can serve as a break in the ring network for data of the specified data type. Depending on the embodiment, the network device (e.g., 102-1) can determine whether data of the specified data type has looped more than once by tracking data (of the specified data type) received at the network device, where the tracking can be facilitated by information including in the data, such as header information (e.g., source address, destination address, etc.) or the port on which the data is received.

At operation 408, as an alternative to operation 404, if the network device (e.g., 102-1) determines that the select data has reached a destination network device as identified by a destination address in the header information, the network device (e.g., 102-1) absorbs and uses the select data locally at the network device. For instance, a local service (e.g., software service) on the network device (e.g., 102-1) can use the select data.

Referring now to the method 500 of FIG. 5, the method 500 illustrates an example of handling data of a specified data type. For some embodiments, the method 400 is performed as part of operation 306 of the method 300 of FIG. 3. At operation 502, a network device (e.g., 102-1) receives, via a second hardware port of a network layer device (e.g., 120-1) of the network device, select data of the non-specified data type communicated on the ring network.

At operation 504, the network device (e.g., 102-1) forwards, based on header information of the select data (e.g., header information for data frame comprising the select data), the select data (received at operation 402) to a first hardware port of the network layer device (e.g., 120-1). In particular, if the network device (e.g., 102-1) determines that the select data has not reached a destination network device as identified by a destination address in the header information, the select data can be forwarded to the first hardware port of the network layer device (e.g., 120-1), which results in the select data being transmitted to an adjacent network device on the ring network coupled to the first hardware port. According to some embodiments, the forwarding of the selected data to the second hardware port or the local hardware port comprises using store-and-forward forwarding (e.g., in accordance with an IEEE network standard).

At operation 506, the network device (e.g., 102-1) prevents the select data (received at operation 502) from looping if the network device (e.g., 102-1) determines that the select data has already looped once around the ring network. The network device (e.g., 102-1) can prevent the select data from looping by preventing the select data from being forwarded and by absorbing (e.g., deleting or discarding) the select data instead. In this way, the network device (e.g., 102-1) can serve as a break in the ring network for data of the non-specified data type. Depending on the embodiment, the network device (e.g., 102-1) can determine whether data of the specified data type has looped more than once by tracking data (of the specified data type) received at the network device, where the tracking can be facilitated by information including in the data, such as header information (e.g., source address, destination address, etc.) or the port on which the data is received.

At operation 508, as an alternative to operation 504, if the network device (e.g., 102-1) determines that the select data has reached a destination network device as identified by a destination address in the header information, the network device (e.g., 102-1) absorbs and uses the select data locally at the network device. For instance, a local service (e.g., software service) on the network device (e.g., 102-1) can use the select data. The select data of the non-specified data type can include, for example, software update data for the network device (e.g., 102-1).

FIG. 6 is a block diagram illustrating components of an example machine 600 that can use one or more embodiments discussed herein. Specifically, FIG. 6 shows a diagrammatic representation of the machine 600 in the example form of a system, within which instructions 602 (e.g., software, a program, an application, an applet, an app, a driver, or other executable code) for causing the machine 600 to perform one or more operations that may make use of one or more of the methodologies discussed herein. For example, the instructions 602 include executable code that causes the machine 600 to execute one or more operations that cause a network layer device (e.g., MAC layer device) of the machine 600 (e.g., embodied by communication components 622) to perform the method 300, 400, or 500. The machine 600 may be coupled (e.g., networked) to other machines. Depending on the embodiment, the machine 600 can implement at least some portion of one of the network devices 102.

By way of non-limiting example, the machine 600 may comprise or correspond to a television, a computer (e.g., an automotive electronic control unit (ECU), a server computer, a client computer, a personal computer (PC), a tablet computer, a laptop computer, or a netbook), a personal digital assistant (PDA), a smart phone, a mobile device, or any machine capable of executing the instructions 602, sequentially or otherwise, that specify actions to be taken by the machine 600. Further, while only a single machine 600 is illustrated, the term "machine" shall also be taken to include a collection of machines 600 that individually or jointly execute the instructions 602.

The machine 600 may include processors 604, memory 606, a storage unit 608, and I/O components 610, which may be configured to communicate with each other such as via a bus 612. In some embodiments, the processors 604 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 614 and a processor 616 that may execute the instructions 602. The term "processor" is intended to include multi-core processors 604 that may comprise two or more independent processors (sometimes referred to as "cores") that may execute instructions 602 contemporaneously. Although FIG. 6 shows multiple processors 604, the machine 600 may include a single processor with a single core, a single processor with multiple cores (e.g., a multi-core processor), multiple processors with a single core, multiple processors with multiple cores, or any combination thereof.

The memory 606 (e.g., a main memory or other memory storage) and the storage unit 608 are both accessible to the processors 604 such as via the bus 612. The memory 606 and the storage unit 608 store the instructions 602. The instructions 602 may also reside, completely or partially, within the memory 606, within the storage unit 608, within at least one of the processors 604 (e.g., within the processor's cache memory), or any suitable combination thereof, during execution thereof by the machine 600. Accordingly, the memory 606, the storage unit 608, and the memory of the processors 604 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM) or other nonvolatile memory (NVM)), and/or any suitable combination thereof. The term "machine-readable medium" should be taken to include a single medium or multiple media (e.g., a centralized or distributed database, or associated caches and servers) able to store the instructions 602. The term "machine-readable medium" shall also be taken to include any medium, or combination of multiple media, that is capable of storing instructions (e.g., instructions 602) for execution by a machine (e.g., machine 600), such that the instructions, when executed by one or more processors of the machine (e.g., processors 604), cause the machine to perform one or more operations that makes use of one or more of the methodologies described herein (e.g., the method 300, 400 or 500). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 610 may include a wide variety of components to receive input, provide output, produce output, transmit information, exchange information, capture measurements, and so on. The specific I/O components 610 that are included in a particular machine 600 will depend on the type of the machine 600. For example, portable machines such as mobile phones will likely include a touch input device or other such input mechanisms, while a headless server machine will likely not include such a touch input device. It will be appreciated that the I/O components 610 may include many other components that are not specifically shown in FIG. 6. The I/O components 610 are grouped according to functionality merely for simplifying the following discussion and the grouping is in no way limiting. In various embodiments, the I/O components 610 may include input components 618 and output components 620. The input components 618 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 620 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 610 may include communication components 622 operable to couple the machine 600 to a network 624 or devices 626 via a coupling 628 and a coupling 630 respectively. For example, the communication components 622 may include a network interface component or another suitable device to interface with the network 624. In further examples, the communication components 622 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 626 may be another machine or any of a wide variety of peripheral devices. According to various embodiments, the communication components 622 can include a transceiver described herein, a receiver described herein, or both.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A system comprising:
a plurality of network devices comprising a plurality of network layer devices, the plurality of network layer devices being operatively coupled together to form a ring network, each individual network layer device in the plurality of network layer devices being configured to communicate data of a specified data type in a first direction on the ring network and to communicate data of a non-specified data type in a second direction on the ring network, the second direction being opposite to the first direction, the individual network layer device being operatively coupled to a first adjacent network layer device in the ring network via a first hardware port of the individual network layer device and operatively coupled to a second adjacent network layer device in the ring network via a second hardware port of the individual network layer device, the individual network layer device being configured to:
receive data of the specified data type communicated on the ring network exclusively via the first hardware port;
transmit data of the specified data type, to be communicated on the ring network, exclusively via the second hardware port;
receive data of the non-specified data type communicated on the ring network exclusively via the second hardware port of the individual network layer device;
transmit data of the non-specified data type, to be communicated on the ring network, exclusively via the first hardware port;
receive first data of the specified data type communicated on the ring network via the first hardware port;
forward, based on header information of the first data, the first data from the first hardware port to the second hardware port using a first forwarding technique;
receive second data of the non-specified data type communicated on the ring network via the second hardware port; and
forward, based on header information of the second data, the second data from the second hardware port to the first hardware port using a second forwarding technique, the first forwarding technique being a lower latency forwarding technique than the second forwarding technique.

2. The system of claim 1, wherein the first forwarding technique comprises cut-through forwarding in accordance with an IEEE network standard, and the second forwarding technique comprises store-and-forward forwarding in accordance with an IEEE network standard.

3. The system of claim 1, wherein each of the first hardware port and the second hardware port is an Ethernet port.

4. The system of claim 1, wherein the individual network layer device is configured to operate as a multi-port bridge.

5. The system of claim 1, wherein the specified data type comprises a plurality of different data types.

6. The system of claim 1, wherein the specified data type comprises a set of time-sensitive data types.

7. The system of claim 1, wherein the non-specified data type comprises any non-time-sensitive data type.

8. The system of claim 1, wherein the specified data type comprises a set of audio data types.

9. The system of claim 1, wherein the non-specified data type comprises any non-audio data type.

10. The system of claim 1, wherein data of the specified data type comprises one or more data frames in accordance with an IEEE 1722 standard.

11. The system of claim 1, wherein the specified data type comprises a set of audio data types, the non-specified data type comprises any data type other than the set of audio data types, a select network device of the plurality of network devices comprising a select network layer device and an audio output, and the select network layer device comprising a local hardware port associated with the audio output, and the select network layer device is configured to:
receive third data of the specified data type communicated on the ring network via the first hardware port of the select network layer device; and
forward, based on header information of the third data, the third data to at least one of the second hardware port of the select network layer device or the local hardware port for output to the audio output.

12. The system of claim 11, wherein the forwarding of the third data uses cut-through forwarding in accordance with an IEEE network standard.

13. The system of claim 11, wherein the select network layer device is configured to:
receive fourth data of the non-specified data type communicated on the ring network via the second hardware port of the select network layer device; and
forward, based on header information of the fourth data, the fourth data to the first hardware port of the select network layer device.

14. The system of claim 13, wherein the forwarding of the fourth data uses store-and-forward forwarding in accordance with an IEEE network standard.

15. The system of claim 1, wherein the specified data type comprises a set of audio data types, the non-specified data type comprises any data type other than the set of audio data types, a select network device of the plurality of network devices comprising a select network layer device, and the select network layer device is configured to:
forward third data of the specified data type to the second hardware port of the select network layer device, the third data being generated on the select network device based on an audio signal captured on the select network device.

16. The system of claim 15, wherein the select network layer device is configured to:
receive fourth data of the non-specified data type communicated on the ring network via the second hardware port of the select network layer device; and
forward, based on header information of the fourth data, the fourth data to the first hardware port of the select network layer device.

17. The system of claim 1, wherein a select network device of the plurality of network devices comprising a select network layer device, and the select network layer device is configured to at least one of prevent data of the specified data type from looping more than once around the ring network, or prevent data of the non-specified data type from looping more than once around the ring network.

18. A network layer device comprising:
a first hardware port configured to be operatively coupled to a first adjacent network layer device in a ring network, the ring network being formed by a plurality of network layer devices operatively coupled together in a daisy-chain, the plurality of network layer devices comprising the network layer device; and a second hardware port to be operatively coupled to a second adjacent network layer device in the ring network, the network layer device being configured to:

communicate data of a specified data type in a first direction on the ring network by receiving data of the specified data type exclusively via the first hardware port, forwarding data of the specified data type from the first hardware port to the second hardware port using a first forwarding technique, and transmitting data of the specified data type exclusively via the second hardware port; and communicate data of a non-specified data type in a second direction on the ring network by receiving data of the non-specified data type exclusively via the second hardware port, forwarding data of the non-specified data type from the second hardware port to the first hardware port using a second forwarding technique, and transmitting data of the non-specified data type exclusively via the first hardware port, the first direction being opposite to the second direction, the first forwarding technique being a lower latency forwarding technique than the second forwarding technique.

19. A method comprising:

communicating, by a network layer device, data of a specified data type in a first direction on a ring network, the ring network being formed by a plurality of network layer devices operatively coupled together in a daisy-chain, the plurality of network layer devices comprising the network layer device, the communicating of data of the specified data type in the first direction on the ring network comprising:

receiving, exclusively by a first hardware port of the network layer device, data of the specified data type communicated on the ring network; and transmitting, exclusively by a second hardware port of the network layer device, data of the specified data type on the ring network;

communicating, by the network layer device, data of a non-specified data type in a second direction on the ring network, the second direction being opposite to the first direction, the communicating of data of the non-specified data type in the second direction on the ring network comprising:

receiving, by the second hardware port, data of the non-specified data type communicated on the ring network; and transmitting, by the first hardware port, data of the non-specified data type on the ring network;

receiving, exclusively by the first hardware port, first data of the specified data type communicated on the ring network;

forwarding, based on header information of the first data, the first data from the first hardware port to the second hardware port using a first forwarding technique;

receiving, exclusively by the second hardware port, second data of the non-specified data type communicated on the ring network; and forwarding, based on header information of the second data, the second data from the second hardware port to the first hardware port using a second forwarding technique, the first forwarding technique being a lower latency forwarding technique than the second forwarding technique.

20. The method of claim 19, wherein the first forwarding technique comprises cut-through forwarding in accordance with an IEEE network standard, and the second forwarding technique comprises store-and-forward forwarding in accordance with an IEEE network standard.

* * * * *